Aug. 14, 1962 B. E. OHLSON 3,048,960
AIR FILTER

Filed Oct. 24, 1958 2 Sheets-Sheet 1

INVENTOR.
Bengt Erik Ohlson
BY
his ATTORNEY

Aug. 14, 1962 B. E. OHLSON 3,048,960
AIR FILTER
Filed Oct. 24, 1958 2 Sheets-Sheet 2
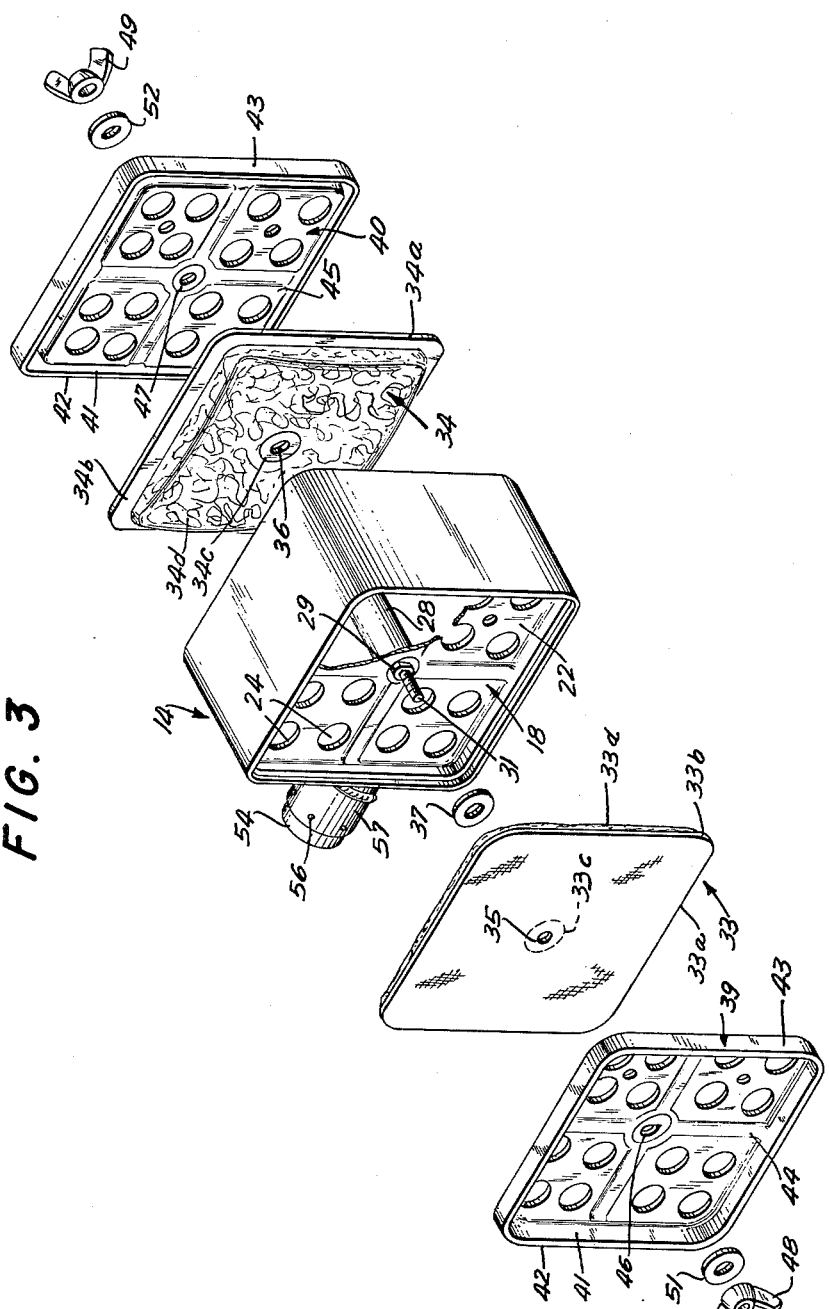
INVENTOR.
Bengt Erik Ohlson
BY
ATTORNEY ated Aug. 14, 1962

3,048,960
AIR FILTER
Bengt Erik Ohlson, Montreal West, Quebec, Canada, assignor to Aktiebolaget Electrolux, Stockholm, Sweden, a corporation of Sweden
Filed Oct. 24, 1958, Ser. No. 769,326
3 Claims. (Cl. 55—372)

This invention relates to air filtering devices, and more particularly to such devices for use with suction cleaners, especially such cleaners of the tank type.

In cleaners of this type, the cleaning tools are carried by a wand attached to one end of a hose, the other end of which is connected to the cleaner casing or tank. A motor driven fan unit is mounted in the tank, and the incoming dirt and dust delivered from the hose are received in a container or dust bag of suitable construction.

While the dust bag or container is a fairly effective filter, it has been found that a relatively small amount of dust of very fine particle size passes through and, for this reason, it is sometimes the practice to employ a secondary filter disposed to act in series with the dust bag. While such a secondary filter can be made to catch finer particles than does the dust bag, it is impractical to employ a secondary filter of unusually fine nature, else a considerable added load is placed on the motor of the suction cleaner, resulting in distinct disadvantages, particularly an unduly high noise level during operation. Hence, in most all such suction cleaners, a material amount of fine dust is carried by the air discharged by the suction cleaner and this is objectionable, especially where, as in hospitals, it is desirable to control the amount of bacteria in the air.

An object of the present invention is, therefore, to provide a novel air filter constructed to be attached to the discharge outlet of such a cleaner, and which will serve to ensure that the escaping air is substantially free from dust. In addition to normal use as a suction cleaner, the improved filter of the invention can be employed to purify the air in a room by removing "fines" and bacteria therefrom, while the cleaner is operated continuously without any hose or cleaning tools attached thereto.

Another object is to devise a filter of this type comprising a casing and dust catching and retaining elements mounted therein, the casing being so constructed that the dust catching and retaining elements can be readily removed and replaced, without the use of tools.

A further object is to provide a filtering attachment from which the air, though ejected forcefully from the suction cleaner, escapes relatively gently and is diffused into the surrounding atmosphere without causing air currents strong enough to stir up or disturb existing deposits of dust in the vicinity.

Yet another object of the invention is to devise a filter structure which is relatively small and compact and which at the same time presents a relatively large area of material through which the air to be filtered flows.

In order that the manner in which these and other objects are attained in accordance with the invention can be understood in detail, reference is had to the accompanying drawings, which form a part of this specification, and wherein:

FIG. 3 is an exploded perspective view showing the various parts making up the filter of FIG. 1.

Figure 1:
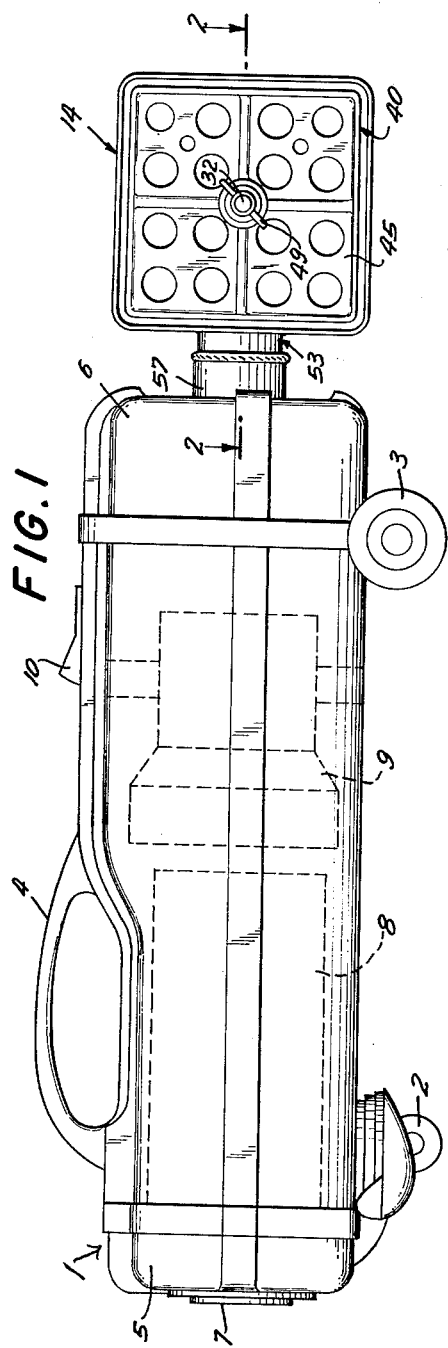
FIG. 1 is a side elevation of a filter constructed in accordance with one embodiment of the invention and associated with one form of conventional tank type suction cleaner.

Referring to the drawings in detail, a conventional suction cleaner is shown as comprising an elongated casing 1 mounted on front and rear wheels 2 and 3 and having a carrying handle 4. At the ends of the casing 1 are front and rear end sections 5 and 6, respectively, the front end section 5 having an inlet opening at 7. The usual hose (not shown), connected at its free end with a wand or the like and suitable cleaning tools, is adapted to be attached to the inlet opening 7, in the usual well-known manner.

Inside the casing is a receptacle or dust bag 8 of the usual or any desired construction, and rearwardly of this bag is mounted a motor and fan unit 9. Current to the motor is controlled by a switch operated by a push button 10 at the top of the casing.

Figure 2:
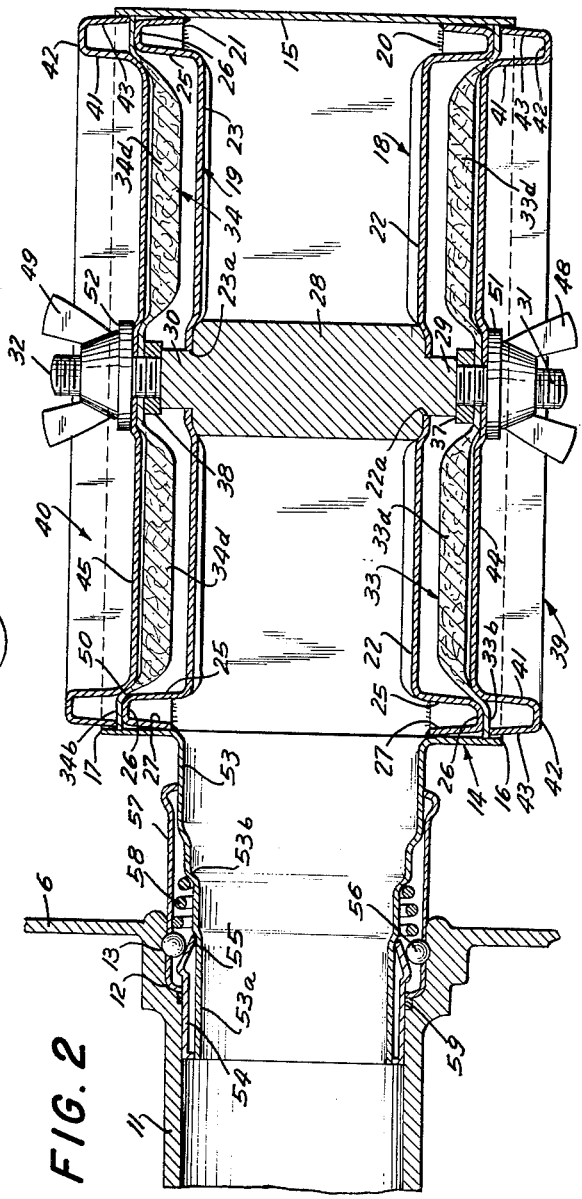
FIG. 2 is a horizontal longitudinal section on an enlarged scale substantially on the line 2—2 of FIG. 1, looking in the direction of the arrows.

The rear section 6 has a discharge opening formed by an inwardly projecting tube 11, FIG. 2. The outer end of this tube has an enlarged bore 12 and an internal annular groove 13 for a purpose hereinafter explained.

The improved filter itself comprises a box-like casing 14 formed by a sheet 15 of metal or other substantially rigid material, the sheet 15 being of uniform width and extending about four sides of a square to define a chamber which is open at two opposite sides 16, 17. Disposed within such chamber, and each extending across a different one of the sides 16, 17, are a pair of inner perforated plates 18, 19 of square plan and generally dish-shaped configuration, the plates 18, 19 being spaced apart and each welded, or otherwise attached, to the sheet 15, as at 20, 21, respectively.

Plates 18, 19 comprise main, generally flat, body portions 22, 23 having central openings $22^a$, $23^a$ and spaced openings or perforations 24. The peripheral portions of plates 18, 19 are of generally U-shaped cross-section, including an upstanding flange 25, a web 26, and an outer flange 27 which extends inwardly of the casing, as seen in detail in FIG. 2. The weld 20 extends along the free edge or lip of outermost flange 27.

Within casing 14, and extending between plates 18 and 19, is a combined spacing and tie bar 28 having at its ends studs 29, 30 extending respectively through the openings $22^a$ and $23^a$ of plates 18 and 19. Threaded shanks 31, 32 extend outwardly from studs 29, 30, respectively, the tie bar, studs and threaded shanks all being coaxial, as shown. As best seen in FIG. 2, the inner faces of plates 18, 19, at the central openings of plates 18, 19, lie in contact with the shoulders provided at the junctures of studs 29, 30 with tie bar 28.

Extending across and spaced from the main outer face of plate 18 is a filter element 33 in the nature of a pad or mat. A like filter element 34 extends across and is spaced from the main outer face of plate 19. Elements 33, 34 are of the same size and outline as the open casing sides 16, 17 and are each provided with a central opening, as at 35 and 36, FIG. 3, through which extend the threaded shanks 31, 32, respectively.

Filter elements 33, 34 are of a well-known construction, comprising a fabric backing sheet at $33^a$, $34^a$ carrying a loosely compacted, fluffy mass of fine fibers, such as cotton mixed with cellulose acetate, carded into a batt. The outer margin of such batt is compressed under heat and pressure to form a thin, dense, peripheral zone or edge portion, bonded to the backing sheet, at $33^b$, $34^b$. That portion of the batt surrounding the central opening of the filter element is similarly compressed and bonded to the backing sheet, as at $33^c$, $34^c$. The main, loosely compacted bodies of the filter elements are seen at $33^d$, $34^d$.

The thin peripheral portions $33^b$, $34^b$ of the filter elements extend across and lie in contact with the webs 26 of the peripheral portions of plates 18, 19 respectively. The thin central portions $33^c$, $34^c$ are supported by spacing washers 37, 38, respectively, engaging the ends of the respective studs 29, 30.

Superposed upon filter elements 33, 34 are the respective ones of a pair of outer, generally dish-shaped, perforated plates 39, 40 which are identical with the plates 18, 19. Thus, outer plates 39, 40 each have a peripheral portion of generally U-shaped cross-section, including an upstanding flange 41, a web 42 and an outer flange 43 extending inwardly of the chamber. Plates 39, 40 have main body portions 44, 45, and central openings 46, 47, FIG. 3, respectively. Threaded shanks 31, 32 extend respectively through openings 46, 47, and the outer plates are clamped in place by wing nuts 48, 49 working respectively on shanks 31, 32. Hence, the central areas of main body portions 44, 45 engage and clamp central areas 33$^c$, 34$^c$, respectively, of the filter elements.

The thin outer edge portions 33$^b$, 34$^b$ of the filter elements are clamped between the bottom web 26 of the peripheral portion of the corresponding inner plate and the inner edges of flanges 41, 43 of the peripheral portion of the corresponding outer plate, the main clamping action occurring along the lines indicated at 50, FIG. 2. It will thus be noted that the outer plates are each nested with the corresponding inner plate, and that the loosely compacted bodies 33$^d$, 34$^d$ of the filter elements are disposed between the spaced main body portions 22, 44 and 23, 45 of the nested plates.

Washers 37 and 38 are of relatively soft, resilient material. Suitable metal washers 51, 52 are provided between nuts 48, 49 and plates 39, 40, respectively. Hence, tightening of the wing nuts compresses washers 37, 38 and provides air-tight seals around the central openings of filter elements 33, 34.

From the foregoing, it is obvious that the filter pads are disposable and that they can be readily removed by taking off the nuts 48 and 29 and the outer plates 39 and 40.

By reference to FIG. 2, it will be seen that the inner pair of plates 18 and 19 are spaced apart to form a chamber between them, and the casing 14 carries an inlet nipple 53 communicating with this chamber and projecting from one end of the casing. Around the outer end 53$^a$ of this nipple extends a sleeve 54 having a bevelled or inclined runway 55 on which a plurality of balls 56 are supported. These balls project through openings in a sleeve 57 surrounding the nipple and are slidable and rotatable thereon. Enclosed within the sleeve 57 is a compression spring 58, one end of which bears against a shoulder 53$^b$ formed on the nipple 53 and the other end of which is adapted to engage the balls 56 so as to resiliently hold them in contact with the runway 55 and cause them to project radially outward through the openings in the sleeve 57. These balls are adapted to snap into the groove 13 formed around the inside of the discharge opening of the suction cleaner when the nipple 53 and sleeve 57 are inserted within this opening. A gasket 59, abutting the end of the sleeve 57, forms an airproof seal.

It will therefore be understood that when the nipple 53 is inserted in the discharge opening of the cleaner casing, the filter is wholly supported by such casing in a position at the rear of the cleaner as shown in FIG. 1. Preferably, the filter casing 14 is made of such size as to conform substantially with the height and width of the cleaner casing so as not to project laterally beyond the same, and, in any event, defines a chamber which is of substantial sizes as compared to the cross section of the discharge opening of the suction cleaner.

It will be observed that the end of the filter casing opposite the inlet nipple 53 is closed, so that there is no free passage of air through the casing in the direction of the axis of the nipple. On the contrary, air delivered from the nipple 53 into the chamber between the plates 18 and 19 can only escape laterally from this chamber, and the full discharge from the suction cleaner is thus divided, and diffuses gently through the filter pads 33 and 34 into the surrounding atmosphere. In this way, strong air currents which might disturb or stir up existing deposits of dust in the vicinity are avoided.

It will be understood that, in operation, the dust bag 8 of the cleaner retains the coarser material while the fine particles escaping from this dust bag are caught or entrapped in the fibrous pad portions 33$^d$ and 34$^d$ of the filter unit. Thus, this filter is in the nature of an auxiliary device serving to prevent the escape of fine particles which would otherwise be discharged from the cleaner into the room.

Advantageously, the filter pads 33, 34 are so constructed as to be capable of preventing the passage of harmful germs and bacteria which may have been entrained with the dirt and dust, and this is particularly advantageous in connection with hospital use.

In fact it is found that if the fan and motor unit are operated with the intake hose and cleaning tools detached from the cleaner so that air from the room is drawn directly into the intake opening 7, the cleaner, with the improved filter attachment, can serve to continuously purify the air in the room by catching and removing therefrom at least a major portion of the fine dust and harmful germs or bacteria which may be floating in the air.

It will be further noted that, although the improved filter is relatively small and compact, it provides a relatively large area of filtering material, due to the use of two independent filter pads, constituting separate paths through both of which the air can flow simultaneously.

What is claimed is:

1. In apparatus of the type described, the combination of a suction cleaner having a casing provided with an inlet and an outlet, a fan for moving air through said casing and discharging the air through said outlet, a motor for driving said fan, and a dust bag disposed in said casing upstream of said fan, motor and outlet for removing foreign particles from air passing through said casing; and an auxiliary filter comprising a box-like casing having walls constructed from sheet material, said box-like casing having open opposed side walls, a first pair of plates spaced from each other and affixed about their peripheries to said box-like casing to define a chamber, an inlet nipple detachably supported in said outlet for detachably mounting said auxiliary filter upon said casing of said cleaner and communicating with said chamber, said plates being perforated, all air discharged from said outlet flowing through the perforations and said open side walls, a pair of mats of fibrous filtering material disposed in contact with said plates for removing from the air foreign particles which pass through said dust bag, a second pair of perforated plates overlying said mats, means for clamping said plates and said mats together, said clamping means comprising a spacing member bridging the space between said first pair of plates, said spacing member having end portions which extend through said plates and said mats, and means attached to said end portions and abutting said second pair of plates for clamping said mats between said plates.

2. In apparatus of the type described, the combination of a suction cleaner having a casing provided with an inlet and an outlet, a dust bag disposed in said casing for removing foreign particles from air passing through said inlet, a fan disposed downstream of said bag, and a motor operative to drive said fan and move air through said casing for discharge from said outlet; and an auxiliary filter comprising a box-like casing open at opposite sides, a pair of inner perforated plates rigidly mounted within said box-like casing and spaced apart to define a chamber therebetween, an inlet nipple affixed to said box-like casing and detachably connected to said outlet, said nipple communicating with said chamber and all the air discharging from said outlet passing into said chamber and through the perforations of said plates, said nipple and outlet being operable to mount said auxiliary filter upon said suction cleaner casing, a pair of mats of fibrous filtering material disposed adjacent to and downstream of said inner plates for removing from the air discharging from said outlet foreign particles which pass said dust bag, a pair of outer perforated plates abutting said mats, means clamping said plates and mats together so that all air discharging from said outlet passes through said mats, said clamping means comprising a spacing member bridging the space between said inner pair of plates, said spacing member having end portions which extend through said plates and said mats, and means attached to said end portions and abutting said outer pair of plates for clamping said mats between said plates.

3. In combination, a tank-type suction cleaner comprising housing means enclosing a fan and motor unit and a dust bag, said cleaner having an intake opening communicating with said dust bag, and a discharge opening, an auxiliary filter comprising a rigid box-like casing having at one end an inlet nipple mounted in the discharge opening of said cleaner, the opposite end of said casing being closed, masses of fibrous filtering material constituting parts of the side walls of said casing whereby the air coming into said casing from said nipple is diffused through said filter material without setting up strong currents in the air surrounding said casing, said filtering material being operable for removing from the air discharged through said discharge opening foreign particles which pass said dust bag, means mounting said masses of fibrous insulating material on said casing, said last-mentioned mounting means comprising a pair of inner apertured members over which the filtering material is positioned, means fixing said inner members to said casing, a pair of outer apertured members positioned over said filtering material, means removably fastening said outer apertured members to said casing to confine each of said masses of material between one of said inner members and one of said outer apertured members at a different one of the opposing side walls of said casing, said fastening means comprising a spacing member bridging the space between said inner pair of apertured members, said spacing member having end portions which extend through said apertured members and said masses of filtering material, and means attached to said end portions and abutting said outer pair of apertured members for clamping said masses of filtering material between said apertured members.

References Cited in the file of this patent

UNITED STATES PATENTS

| | | |
|---|---|---|
| 1,499,864 | Gordon | July 1, 1924 |
| 2,028,861 | Bieth | Jan. 28, 1936 |
| 2,220,374 | Lewis | Nov. 5, 1940 |
| 2,555,742 | Grue | June 5, 1951 |
| 2,564,845 | Holt | Aug. 21, 1951 |
| 2,743,787 | Seck | May 1, 1956 |